Sept. 9, 1941.   I. C. POPPER   2,255,515
TURBINE DRIVE AND FLUID FLYWHEEL AND MEANS FOR TRANSMITTING POWER THEREIN
Filed Feb. 23, 1939   4 Sheets-Sheet 4

Inventor
Isaac C. Popper,
By Chas. Silver
Attorney

Patented Sept. 9, 1941

2,255,515

UNITED STATES PATENT OFFICE 2,255,515

TURBINE DRIVE AND FLUID FLYWHEEL AND MEANS FOR TRANSMITTING POWER THEREIN

Isaac C. Popper, New York, N. Y., assignor to Automatic Turbine Drive Company, Inc., a corporation of New York Application February 23, 1939, Serial No. 258,068

13 Claims. (Cl. 252—74)

This application is a continuation-in-part of my pending applications Serial No. 697,334, filed November 9, 1933, Serial No. 713,388, filed February 28, 1934, Serial Nos. 751,668 and 751,669, filed November 5, 1934 and Serial No. 24,779, filed June 3, 1935.

This invention relates to turbine drives and fluid fly-wheels and has particular reference to a novel combination of elements which will properly function as turbine drives and fluid fly-wheels.

In many respects the present invention is similar to those referred to, but it includes certain refinements which will be hereinafter fully described and set forth in the claims. The purpose of these particular improvements is to gain a faster start, a quicker pick-up, and more power in climbing hills as well as in ordinary travel.

This invention like the others above-mentioned includes two rotors having opposed counterpart cooperating buckets or scoops formed by spaced vanes or partitions of special and novel form, one of these rotors being secured to the fly-wheel and the other to a driven shaft, the buckets or scoops and vanes or partitions being properly housed to form intercommunicating fluid chambers in combination with a reservoir which automatically keeps the pressure and the supply of fluid more or less constant.

With this combination of elements, a gearless hydraulic turbine clutch and transmission are provided, which makes it possible for the operator to control the movement of the car by feeding the gas when the car is started and driven, and applying the brake when the speed is to be reduced and/or the car is to be brought to a stop.

In the operation of my turbine drive and fluid fly-wheel on the engine of an automobile, I have found that the fluid medium should possess the proper specific gravity and viscosity to carry the driven rotor along with the driving rotor at practically the same speed as the driving rotor when the automobile is under ordinary load and travelling upwards of 20 miles per hour, in order that there will be no slip between the rotors. But with a fluid of such specific gravity and viscosity, the driving rotor will revolve faster than the driven rotor when the speed of the automobile is being increased up to the 20 miles per hour rate and also when the automobile engine is subjected to greater load during hill climbing or over rough roads, thus causing slip between the rotors.

Among the objects of this invention is to provide a turbine drive and fluid fly-wheel, wherein the elements will not become impaired when parts of the combination are moved at extraordinary high rates of speed relative to adjacent parts, and wherein none of the elements become objectionably heated, appreciably exhausted or deteriorated in use.

A further object of this invention is to provide, as an element of such combination, a power transmitting fluid adapted to pass between opposedly moving rotors of the fluid fly-wheel, the fluid being of proper specific gravity, viscosity and adjustment as to temperature of volatilization of the components of the fluid and solidification of the fluid. This fluid should be of proper specific gravity and viscosity to effect rotation of the driven rotor at practically the same speed as the driving rotor at automobile speeds of 20 miles per hour and more and under ordinary loads, but to develop no objectionable overheating by the slip between the rotors when the automobile speed is lower or when it is under greater load, as in hill climbing.

Other, further and more specific objects of this invention will become readily apparent to persons skilled in the art from a consideration of the following description when taken in conjunction with the accompanying drawings wherein:

Fig. 8 is an enlarged section on the line 8—8 of Fig. 3 looking in the direction of the arrows.

The numeral 1 represents the fly-wheel having the usual teeth 2 around its periphery for the starter (not shown) to engage.

Figure 1:
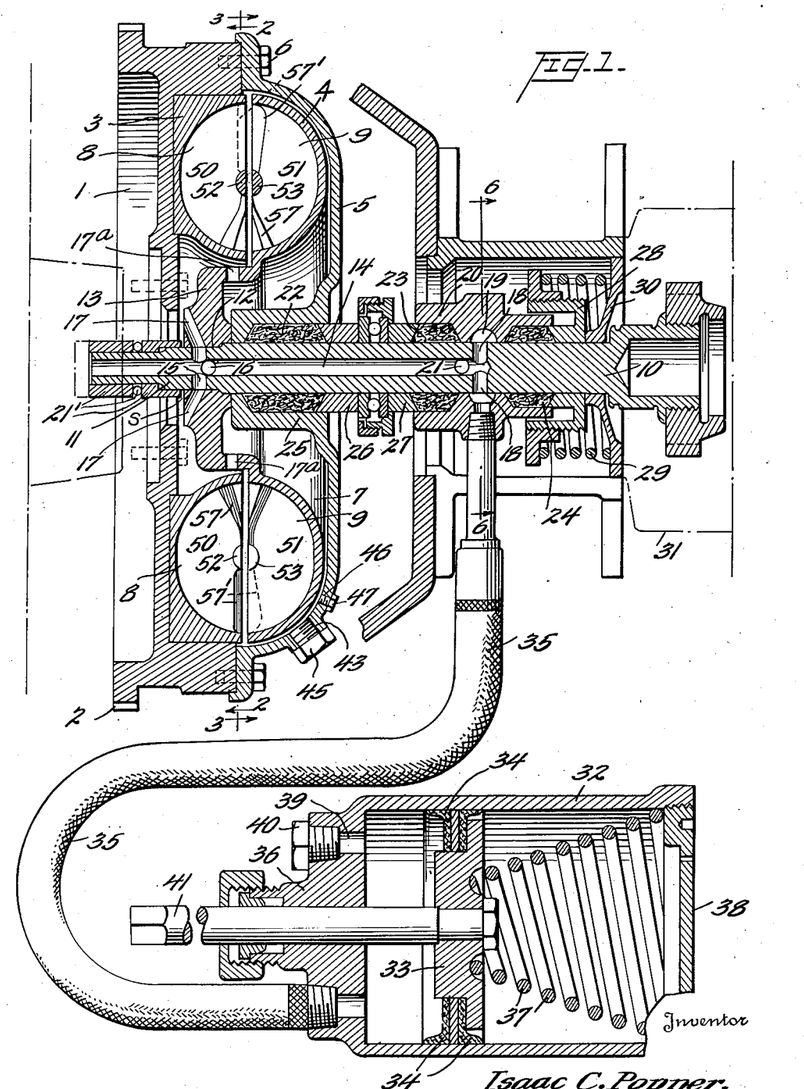
Fig. 1 is a section through the various parts constituting my improved invention.

The numeral 3 indicates the driving rotor integrally or rigidly secured to the fly-wheel as viewed in Fig. 1.

The numeral 4 shows the driven rotor, and 5 is a casing held by bolts or other means 6 to the fly-wheel 1, thereby enclosing the two rotors and forming a hydraulic chamber 7 therebetween.

The two rotors are provided with oppositely facing vanes 8 and 9 respectively, the driving rotor 3 preferably having two more vanes than the driven rotor 4. Obviously this difference in number of vanes might be varied, as one rotor might have four more vanes than the other and possibly even more, according to circumstances. This provision is mainly designed to lessen any tendency to stall the motor in the transmission of power from one rotor to the other, and the principle is readily understood because the differential in vanes insures against more than two vanes on each rotor ever being opposite the vanes on the other, so that at all times there is a constant flow and agitation in and out and freedom of movement of the fluid between the vanes of the two rotors. The vanes 8 and 9 are spaced apart so as to form buckets or scoops 50 and 51, respectively, therebetween.

Figure 9:
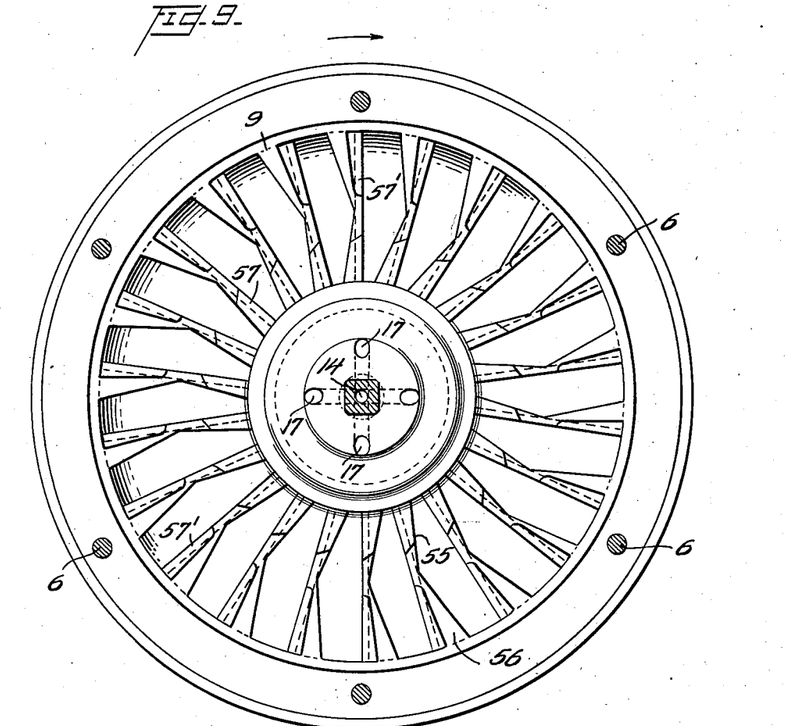
Fig. 9 is a view of a modified form of rotor which is similar to the other rotors except that the annular baffle is omitted entirely.

In the particular construction illustrated, the vanes 8 in the driving rotor 3, and the vanes 9 in the driven rotor 4 are partially separated by annular, oppositely placed core guide rings 52 and 53, respectively. As disclosed, these are flat on their inner faces and rounded on their outer faces. They are similar to corresponding core guide rings shown in my previous applications, but much narrower. The contemplated purpose of these core guide rings is to direct and insure the proper passage and circulation of the fluid. I have found by actual experimentation and use that a faster start, a quicker pick-up, and more power, along with other features, result from this change in the dimensions of the core guide rings, and I even contemplate dispensing with them altogether as illustrated in Fig. 9, in which the construction of the vanes is the same as to Figs. 1 to 8, except that the core guide rings are entirely omitted. Other important advantages reside in the particular formation of the vanes or partitions which differ from those employed in my former applications, as will now be pointed out.

Figure 2:
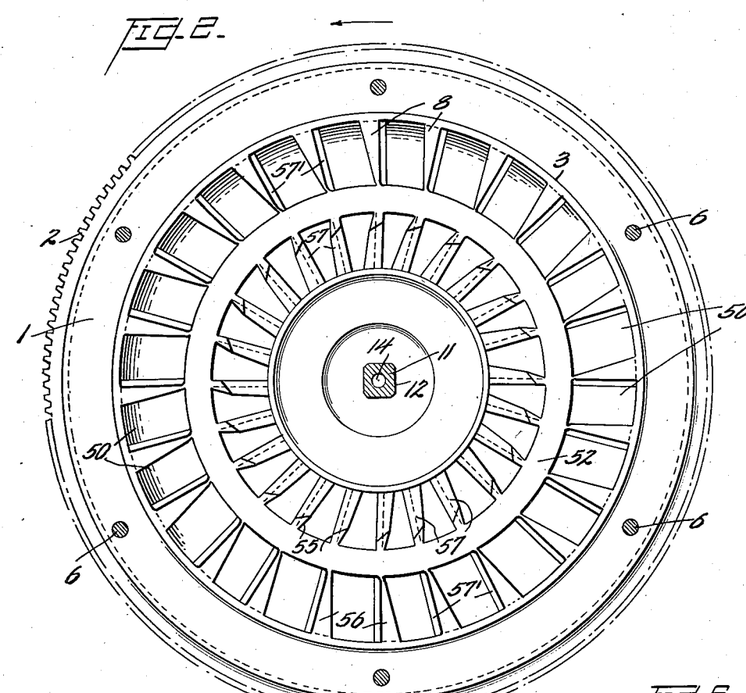
Fig. 2 is a face view of the driving rotor taken on the line 2—2 of Fig. 1.
Figure 3:
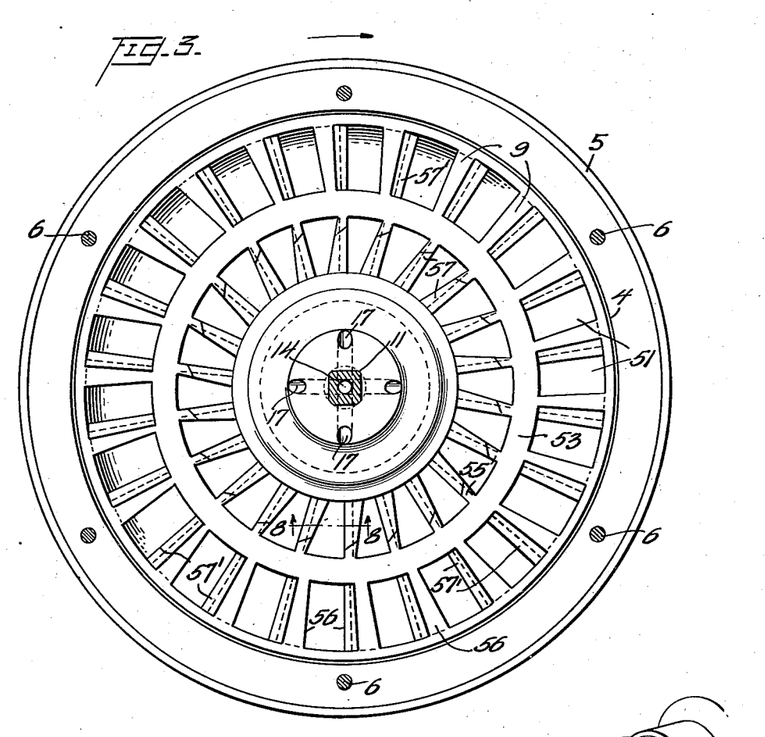
Fig. 3 is a similar view of the driven rotor taken on the line 3—3 of Fig. 1.
Figure 7:
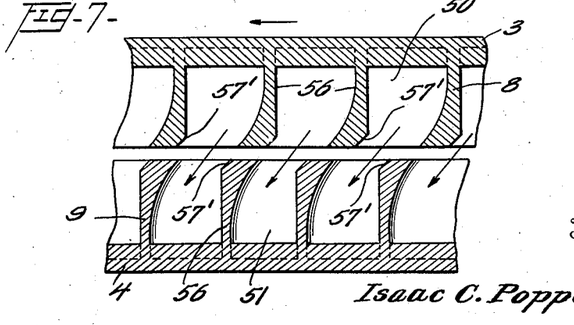
Fig. 7 is a greatly enlarged fragmentary sectional view through the two rotors showing diagrammatically the relative relationship between the two.

Each of the vanes or partitions 8 and 9 has its inner end portion, inside the ring 52 or 53, designated by the numeral 55, and the outer end portion, externally of the ring 52 or 53, designated 56. These end portions 55 and 56 are in radial alignment and in reality are continuations of each other, except that the core guide rings 52 and 53 partially separate them in the form shown in Figs. 1 to 8. On one side of each vane 8 or 9, the corresponding side faces of end portions 55 and 56 are directly in alignment and form a straight line or plane, as shown in Figs. 2 and 3; but on the other side of each vane 8 or 9, the corresponding side faces of end portions 55 and 56 are at an obtuse angle to each other for a portion of the height of each, the edge portions of each vane 8 or 9 being widened out at opposite ends as very clearly illustrated in Figs. 2 and 3, so as to form a thicker edge than the under part of each vane, as shown in Figs. 7 and 8. The edges of the portions 55 and 56 are beveled as at 57 and 57', the bevel always extending from the straight or plane face side, as will be seen in Figs. 2 and 3 and also in Figs. 7 and 8. The face of each portion 56 opposite the bevel 57', is concave or curved, as shown in Fig. 7, while the face of each portion 55, opposite the bevel 57, is inclined so as to form a side which is generally concave.

The vanes are thus formed to give a scoop formation to the buckets 50 and 51, which will be best seen by referring to Figs. 7 and 8.

The starting and turning of the driving-rotor is counter-clockwise looking forward as indicated by the arrow in Fig. 2, or clockwise, looking rearward, as in Fig. 9, and of course the driven rotor 4 when facing the rotor 3, as in Fig. 1, is driven in the same direction and, when in full operation, at the same speed as if they were a single unit.

The purpose of these scoop-shaped buckets is to increase the vortex movement of the fluid between the rotors in a spiral direction into and out of the buckets as indicated by the curved arrows in Figs. 7 and 8. This, with the other novel features, gives the faster start, quicker pick-up, and the added power in hill-climbing and normal travel of the machine in which the mechanism is installed.

It will be observed that the driven rotor has a slight play back and forth on the squared end 11 of the shaft 10, as shown in Fig. 1, clearance S being provided for this purpose. The drawing shows the two rotors separated to the fullest extent possible, and this is the relative position at slow speed, such as when the engine or automobile is started. But as they gain speed the driven rotor is free to move toward the driving rotor. A thrust-bearing 21' which may be held in place by the crank shaft forms an abutment at one end and prevents the rotors from touching each other while movement in the opposite direction is limited by the driven shaft 10, and the end of packing box 25 forms in the casing 5, so that the peripheral portion of the driven rotor will be held out of engagement with the casing.

Figures 4, 5:
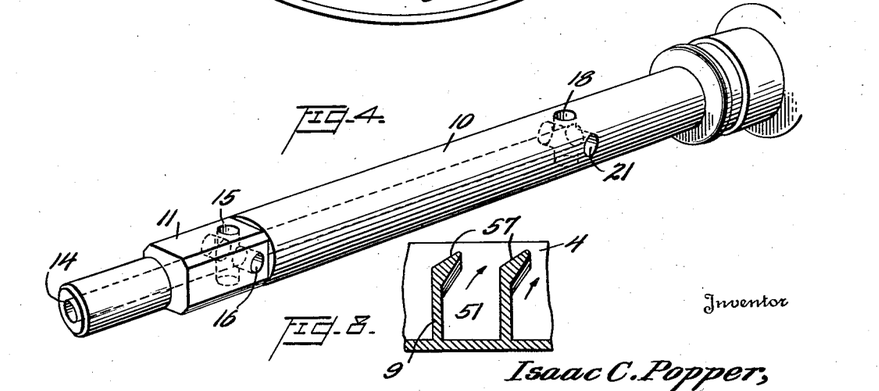
Fig. 4 is a perspective view of the driven shaft.
Fig. 5 is a fragmentary perspective of a portion of the driving rotor.
Figure 5:
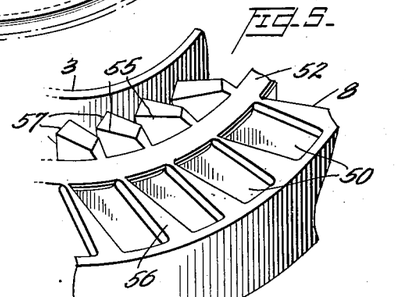
Figure 6:
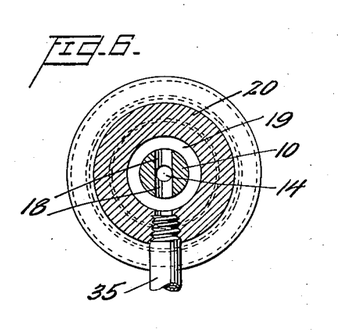
Fig. 6 is a section on the line 6—6 of Fig. 1, looking in the direction of the arrow.

The driven shaft 10 extends through the center of the casing 5, and one end is preferably squared as at 11 (see Fig. 4) and fitted to a corresponding aperture 12 through the center of the hub 13 of the driven rotor 4, as viewed in Fig. 1, to insure their rotating together.

The driven shaft is bored longitudinally through the center, as at 14 (as shown in Fig. 1) for a portion of its length to form an oil-channel, and the lateral ducts 15 and 16 extend radially therefrom, and the ducts 15 are shown in registry with ducts 17 in the hub 13 of the driven rotor. The ducts 15 and 16 are provided for the different positions of the movable rotor.

Ducts 18 communicate with the circumferential channel 19 in the gland 20, and ducts 21 are in reserve to take the place of the ducts 18 when adjustment is made to take up the wear of the packing and packing-rings.

The packings are indicated by the numerals 22, 23 and 24 (see Fig. 1). The packing-box 25, packing-rings 26 and 27, the gland 20 and the follower 28, all surrounding and concentric with the driven shaft 10, house and protect and hold under compression the several packings, so that there is no possibility of escape of the oil or other liquid.

The follower 28 is held against the packing 24 by a stout spiral spring 29. This spring 29 is backed by a cage 30 secured to a part 31 of the frame of the machine.

The numeral 32 represents a compression cylinder and fluid reserve tank of a compensator, and 33 is a piston tightly fitted thereto and having packing-rings 34 to prevent the escape of fluid. A pipe 35 extends out of the head 36 of this cylinder and is connected with the channel 19 formed in the gland 20.

A sturdy spiral spring 37 held between the head 38 of the cylinder and the back of the piston 33 forces the piston forward at all times or to the left in Fig. 1. Oil or other fluid may be supplied through an opening 43 in the casing 5 or through the hole 39 in the head 36 of the cylinder, which hole is closed by the screw-plug 40.

The chamber 7 between the driving and driven rotors, and the space between the piston and the head 36 of the cylinder, are in constant communication by reason of the communication provided through the flexible pipe 35, the bore 14 of the driven shaft, and the ducts 15 or 16, and 17, and the ducts 18 or 21 and the circumferential channel 19 of the gland 20.

To facilitate the movement of fluid from one side of the chamber 7 to the other, the orifices 17a are formed in the hub 13.

In filling this space with the liquid, the piston-rod 41 is forced back to a degree against the expansible pressure of the spring 37, the desired amount of fluid is poured through the opening 43 above described, and the opening is then closed, by a screw plug 45 or the system may be filled through the hole 39, if desired.

The opening 43 may be turned to the bottom for draining the fluid chamber 7, and the parts turned in the opposite position, namely at the top, when the chamber 7 is to be refilled. A refilling of chamber 7 is seldom necessary if some proper fluid is used which will not heat excessively or vaporize. In filling the fluid chamber 7, the piston 33 is first forced part way back against the action of the spring 37. The fluid is then poured in until it reaches the top. The air-hole 46 may be opened by removing the plug 47 to facilitate pouring in the fluid. After this shall have been done, the piston 33 is forced still further back against the pressure of spring 37, but preferably not all the way. By the suction thus created, the level of the fluid in the chamber 7 is lowered, and more fluid is poured in the space thus created at the top of the chamber until it reaches its full capacity or a prescribed level. The plugs 45 and 47 are then screwed into the openings 43 and 46 and the mechanism is ready for use.

As fuel is fed to the engine, the crankshaft thereof is rotated, driving the fly-wheel which at first with its rotor moves independently of the driven rotor 4, and as the fly-wheel gains momentum the rotary motion is communicated to the driven rotor just as fast as it will respond, and with a very quick pick-up, the driven rotor almost immediately commences to turn with the driving rotor and thus the driven shaft is set in motion and the wheels of the vehicle are made to turn and propel the vehicle without the possibility of any sudden jerk as is incident to the shifting of gears in the ordinary geared car when carelessly or unskillfully manipulated. Anything of the sort is rendered impossible in the present mechanism, which is one of the marked advantages of this invention.

For reversing and neutral any approved mechanism (not shown) may be used. In fact the ordinary shift-gears may be left in the car, if desired, and kept in high all the time except when used for reversing and neutral or in climbing extra steep grades.

The fluid medium, as a novel element per se and as an important element of a novel combination, is an important feature of the present invention. This fluid medium is of a nature which remains constant and enduring and does not become wasted or exhausted or greatly heated by reason of the friction and churning and agitation due to the slippage between rotors and a circulatory motion imparted to the fluid due to the turbine action and the transmission of motion from one rotor to the other.

The fluid in my fluid fly-wheel combination performs functions which are decidedly different than those performed by fluids in other circulating systems, such as anti-freeze liquids, non-corrosive mixtures, hydraulic brake fluids and mixtures for shock absorbers.

1. In my fluid fly-wheel, the liquid must be of proper specific gravity to exert the proper force of impact from the driving to the driven rotor blades and to utilize to advantage the centrifugal force of rotation so as to assist instead of oppose the normal functions of the fly-wheel.

2. The liquid must be fluid at ordinary temperatures and of proper viscosity to effect rotation of the driven rotor at practically the same speed as the driving rotor at automobile speeds of 20 miles per hour and more and under ordinary loads, but to develop no objectionable overheating by the slip between the rotors when the automobile speed is lower or when it is under greater load, as in hill climbing.

3. The liquid should not appreciably vaporize or generate obnoxious odors by the heat resulting from slip of the rotors. Vaporization of the fluid often results in building up dangerous gas pressures in the system as well as loss of the fluid itself, thereby necessitating refill of the fluid chamber. If the rotors are not completely submerged in fluid, there is a decrease in efficiency of the power delivery from the driver to the driven rotor. Also, if the more volatile components of the fluid are evolved the residue will not possess the proper viscosity and specific gravity.

4. For universal application, and particularly in localities of low temperature, the liquid should have a sufficiently low freezing point to assure against its solidification during the most adverse conditions of temperature.

5. When my device is employed on an automobile, the liquid should provide the proper "slip" between the rotors when the automobile is building up speed and also when it is travelling up hill.

6. The liquid should not form a hardened or thick emulsion by the churning or agitation to which it is subjected when the rotors are in operation.

7. The liquid should not corrode the mechanism in contact therewith under the conditions of use.

8. The liquid should carry no solid material that promotes objectionable heating when the fluid is agitated, that settles rapidly or would form crusty or caky coherent sediment on standing.

9. The liquid should form no gummy matter or films.

The fluids in other circulating systems are not compounded with the view of possessing these essential characteristics. For example, antifreezing mixtures and compositions proposed for hydraulic drives, while required to possess some of the essential characteristics of my fluid medium, do not possess other indispensable characteristics and properties, which are unique in my new composition, that forms an indispensable element of my invention. Numerous organic liquids of a single, as well as plurality of components, have been tried, but were found wanting due to their failure to meet the essential requirements of my fluid medium in one or more of the characteristics set forth heretofore. Materials satisfactory in some respects, proved insufficient in other respects.

I have found that a composition suitable for use in my turbine drive and fluid fly-wheel should have lubricating qualities, a specific gravity of 1.1 to 1.35 at 80° F. and a viscosity of 30 minutes to 150 minutes at 88° F. with Saybolt Standard Universal viscosimeter. It should be composed of materials which suffer no loss in weight when this fluid composition is subjected to high agitation and churning, such as in the operation of the device on an automobile, for total running time of at least 500 hours, are non-drying and form no gummy films, no gummy sediment and no crusty deposits on standing.

In preparing my fluid medium, I employ a reaction product of boric acid and a polyhydric alcohol, such as glycerol, ethylene glycol, diethylene glycol, triethylene glycol, propylene glycol and dipropylene glycol. These condensation products are thick materials of varying viscosity. I incorporate with one or more of these condensation products a thinning organic liquid of high boiling point, such as glycerine, ethylene glycol, diethylene glycol, triethylene glycol, propylene glycol, dipropylene glycol, methyl carbitol (diethylene glycol monomethyl ether), carbitol (diethylene glycol monoethyl ether), butyl carbitol (diethylene glycol monobutyl ether), diethyl carbitol (diethyl ether of diethylene glycol), dimethoxy tetraglycol (dimethyl ether of tetraethylene), monoethanolamine, diethanolamine, triethanolamine and sorbitol (a hexahydric alcohol). The mixture is thinned to give the desired specific gravity, which for the final product ranges from 1.1 to 1.35 at 80° F., and also the desired viscosity, which for the final product ranges from 30 to 150 minutes at 88° F., as determined by the Saybolt Standard Universal viscosimeter. The mixtures of higher viscosity are employed with turbine drives and fluid fly-wheels on automobiles for heavier duty. If desired, a small quantity of an aqueous solution of anti-freezing salt may replace part of the organic thinning liquid in bringing the fluid to the desired viscosity and specific gravity.

A modification of my invention consists in employing a low viscosity mixture of the condensation product with one of the above thinners, adding thereto a small quantity of an aqueous solution of anti-freeze salt and thickening the mass with powdered, inert material until the desired viscosity of the mass is reached.

A still further modification of my invention is to take one of the more viscous of the above thinners, such as glycerine, add thereto a small quantity of a concentrated aqueous solution of anti-freeze salt and thicken the mass with powdered, inert material until the desired viscosity of the mass is reached.

An advantage of the alternative fluids resides in the fact that the more expensive reaction product is in the one case employed in smaller quantity and in the other case entirely dispensed with. A disadvantage is in the use of a solid, which must be sufficiently light and fine to remain uniformly dispersed for long periods of time when the fluid is idle.

The concentrated anti-freeze salt solution serves to prevent evaporation at low temperatures of the water introduced into the fluid by materials, such as glycerine, sorbitol and the reaction products of boric acid and the polyhydric alcohols and also to retard the freezing of this water.

Specific examples of my fluid medium are as follows:

1. A mixture of forty-five percent of sorbitol (a sirup of this material of about fifteen percent water content) and fifty-five percent glycol boriborate (a reaction product of boric acid and glycol) has a specific gravity of about 1.315 at 80° F. and a viscosity of 90 minutes at 88° F. on the Saybolt Standard Universal viscosimeter. Fluid of this character is for use with fluid fly-wheels on engines of heavy duty.

Glycol boriborate, also known to the trade as Aquaresin, and covered by U. S. Patent No. 1,953,741, is a product manufactured by the Glyco Products Co., Inc., of New York. As described on page 23 of the January 1939 catalogue of this company, glycol boriborate is a non-drying, odorless, viscous liquid of light amber color having a specific gravity of 1.361 at 22°/22° C. It is completely soluble in water, alcohol, glycerine and the glycols, and insoluble in hydrocarbons.

2. A mixture of fifty percent of sorbitol and fifty percent glycol boriborate has a specific gravity of about 1.315 at 80° F. and a viscosity of 50 minutes at 88° F. on the Saybolt Standard Universal viscosimeter. Fluid of this character is for use with fluid fly-wheels on engines of light duty.

3. A mixture of eighty percent of triethanolamine and twenty percent ethylene glycol has a specific gravity of about 1.125 at 80° F. and a viscosity of 10 minutes at 88° F. on the Saybolt Standard Universal viscosimeter. This mixture is used with a concentrated solution of anti-freezing salt and powdered solid material. A specific example of a suitable mixture consists in the use of an aqueous solution of Epsom salt (one tablespoon of Epsom salt in four ounces of water) with one gallon of this triethanolamine-ethylene glycol mixture. To this are added 2.5 ounces of powdered chalk. In preparing the composition, the salt solution is poured upon the mixture of organic liquids, the chalk is then poured upon the mixture, which is then stirred and heated to a temperature of 180–90° F. Fluid of this character is for use with fluid fly-wheels on engines of lighter duty. If the fluid is intended for use with fluid fly-wheels on engines of heavier duty, the proportion of powdered chalk is increased relative to the other components of the mixture. From four to eight ounces of the powdered chalk per gallon of fluid may be used, depending on the power of the engine wherein the fluid is to be employed. The thicker fluid gives greater car pull.

4. Glycerine (which contains about five percent water and has a specific gravity of 1.25 at 80° F.) is used instead of the triethanolamine-ethylene glycol mixture in Example 3. By regulating the quantity of powdered chalk, the fluid can be prepared for use with fluid fly-wheels on engines of either light or heavy duty.

5. A mixture of seventy percent of triethanolamine and thirty percent of triethylene glycol can be used in lieu of the triethanolamine-ethylene glycol mixture in Example 3 for preparing fluids for use with fluid fly-wheels on engines of light or heavy duty.

6. A mixture of seventy percent of diethylene glycol and thirty percent of glycerol borate (a reaction product of boric acid and glycerin in the form of a very thick syrup) may be used in lieu of the triethanolamine-ethylene glycol in Example 3 to prepare fluids for use with fluid fly-wheels on engines of light or heavy duty.

7. A mixture of sixty-five percent of diethylene glycol and thirty-five percent of glycol boriborate may be used in lieu of the triethanolamine-ethylene glycol in Example 3 to prepare fluids for use with fluid fly-wheels on engines of light or heavy duty.

8. A mixture of thirty-five percent of glycerolborate and sixty-five percent of glycerine (which contains about five percent of water) may be used with fluid fly-wheels on engines of light duty.

9. A mixture of fifty-five percent of glycol boriborate and forty-five percent of glycerine (which contains about five percent of water) may be used with fluid fly-wheels on engines of light duty.

10. A mixture of sixty-five percent of glycol boriborate and thirty-five percent of triethylene glycol may be used with fluid fly-wheels on engines of heavy duty.

In Examples 1, 2, 8, 9 and 10, from one to five percent of an aqueous solution of Epsom salt or equivalent anti-freezing salt may be used in lieu of part of the organic thinning liquids, the amount of the latter being reduced to an extent that the final fluid will have the desired viscosity.

It is to be understood that instead of using only a single reaction product of boric acid and a polyhydric alcohol, two or more of these reaction products may be employed in a single fluid mixture. Also, instead of a single thinning organic liquid, two or more of the materials above specified may be employed.

The anti-freezing salts which I have found suitable for my composition are Epsom salt, magnesium chloride, common salt, sodium sulphate, potassium sulphate, potassium chloride, iron sulphate, zinc sulphate, zinc chloride, calcium chloride, aluminum sulphate, the alums, sodium oxalate, potassium oxalate, etc.

The solid materials found suitable for my purpose are powdered chalk, fuller's earth, lamp black, graphite, etc. It is desirable to free the lamp black and graphite of traces of gummy or sticky materials which often become associated with these substances during the process of manufacture. These materials should be of light weight and preferably inert. Certain powdered materials having high abrasive values, such as diatomaceous earth and emery, are not preferred, because of their tendency to heat the liquid by friction.

In the operation of my device on an automobile driving on a smooth level road and with fluid of proper specific gravity and viscosity, when the engine is started, the driving rotor revolves faster than the driven rotor until the automobile attains a speed of 20 to 30 miles per hour, depending upon the characteristics of the fluid employed. During this period while the rotors are travelling at unequal speeds, there is a slip between these rotors, and the fluid does not exert full gripping action. This slip is accompanied by internal friction heating and in some cases will cause the fluid to rise to 150 to 160° F. Just as soon as the speed of 20 to 30 miles per hour is reached, corresponding to the particular fluid employed, the gripping action of the fluid is such as to cause the pair of rotors to revolve substantially at the same speed. When this occurs, there is little or no slip and the factors operating toward the creation of friction by heating are considerably reduced. The temperature of the fluid then drops to 90–110° F., depending upon the speed at which the automobile is operated and the road conditions.

It will therefore be seen, that it is during the period when slip occurs between the rotors that the heating tendencies exist and my special fluid has been evolved, after much trial and experiment, to minimize this tendency toward frictional heating during the periods of slip, while at the same time retaining the full benefits of the gripping action of the fluid when the automobile is travelling at the higher speeds over fairly level roads.

During most of the operation of automobiles, the cars travel over level or nearly level roads that are not rough and at speeds of about 20 miles per hour or more in the case of automobiles designed for slower travel and at speeds of about 30 miles per hour or more in the case of cars designed for faster travel. My turbine drive and fly wheel fluid is regulated as to specific gravity and viscosity so that the full gripping action of the fluid on the rotors takes place during such prevailing conditions of operation, thereby providing for the rotors to revolve substantially at the same speed and with little or no slip during most of the operation of the cars. It follows, therefore, that by this regulation of my fluid medium, the fluid can be kept at the low temperature of 90–110° F. during most of the operation of the vehicles for all types of automobiles, i. e. for passenger cars as well as trucks, designed for either slow speed, medium speed or high speed travel.

When the automobile is descending a road of slight slope, the driving and driven rotors also move together at automobile speeds of 20 miles per hour or more and there is little or no slip. In descending steep slopes however, when the transmission mechanism is set in either first or second gear, the driven rotor moves slower than the driving rotor and there is substantial slip between the rotors. This allows the engine to act as a brake for the automobile. Also, travelling on a road of more than light upward slope, whether the engine be in high gear or in first or second gear, the driving and driven rotors do not move together and there is a slip between the rotors. Therefore, in the conditions of automobile travel referred to in this paragraph, heating by friction takes place with temperature rise of the fluid medium.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A fluid composition having a specific gravity of 1.1 to 1.35 at 80° F. and a viscosity of 30 to 150 minutes at 88° F., as determined by the Saybolt Standard Universal viscosimeter and comprising a thinning organic liquid and a reaction product of boric acid and a member of the group consisting of the glycols and glycerine, said thinning organic liquid being a member of the group consisting of glycerine, the glycols, diethylene glycol monomethyl ether, diethylene glycol monoethyl ether, diethylene glycol monobutyl ether, diethyl ether of diethylene glycol, the ethanolamines and sorbitol.

2. A fluid composition having a specific gravity of 1.2 to 1.325 at 80° F. and a viscosity of 45 to 100 minutes at 88° F., as determined by the Saybolt Standard Universal viscosimeter and comprising a thinning organic liquid and a reaction product of boric acid and a member of the group consisting of the glycols and glycerine, said thinning organic liquid being a member of the group consisting of glycerine, the glycols, diethylene glycol monomethyl ether, diethylene glycol monoethyl ether, diethylene glycol monobutyl ether, diethyl ether of diethylene glycol, the ethanolamines and sorbitol.

3. A fluid composition having a specific gravity of about 1.315 at 80° F. and a viscosity of about 50 minutes at 88° F., as determined by the Saybolt Standard Universal viscosimeter and comprising an anti-freezing salt, a glycol and a reaction product of boric acid and a member of the group consisting of the glycols and glycerine.

4. A fluid composition having a specific gravity of 1.2 to 1.325 at 80° F. and a viscosity of 45 to 100 minutes at 88° F., as determined by the Saybolt Standard Universal viscosimeter and comprising glycol boriborate, diethylene glycol, an anti-freezing salt and soft, light, inert powdery material.

5. A fluid composition having a specific gravity of 1.2 to 1.325 at 80° F. and a viscosity of 45 to 100 minutes at 88° F., as determined by the Saybolt Standard Universal viscosimeter and consisting essentially of a small quantity of powdered chalk, 90 to 95 percent of glycerine and a concentrated solution of Epsom salt serving to lower the freezing point of the composition and as a dispersing agent for said chalk.

6. A fluid for transmitting power from the driving rotor to the driven rotor in turbine drives and fluid fly-wheels of an automobile engine and carry the driven along with the driving rotor at substantially the same speed as the driving rotor when the automobile is travelling under ordinary load and to suffer no loss in weight for a total running time of at least 500 hours by frictional heating of said fluid when slip takes place between rotors under other conditions of operation, said fluid being non-drying, forming no gummy films, no gummy sediment and no crusty deposits on standing, having lubricating qualities, a specific gravity of 1.1 to 1.35 at 80° F. and a viscosity of 30 to 150 minutes at 88° F., as determined by the Saybolt Standard Universal viscosimeter, and comprising a thinning organic liquid of boiling point within the limits of 172–290° C. and a reaction product of boric acid and a member of the group consisting of the glycols and glycerine.

7. A fluid for transmitting power from the driving rotor to the driven rotor in turbine drives and fluid fly-wheels of an automobile engine and carry the driven along with the driving rotor at substantially the same speed as the driving rotor when the automobile is travelling on substantially level roads upwards of 20 miles per hour and under ordinary load and to suffer no loss in weight for a total running time of at least 500 hours by frictional heating of said fluid when slip takes place between rotors under other conditions of operation, said fluid being non-drying, forming no gummy films, no gummy sediment and no crusty deposits on standing, having lubricating qualities, a specific gravity of 1.2 to 1.325 at 80° F. and a viscosity of 45 to 100 minutes at 88° F., as determined by the Saybolt Standard Universal viscosimeter and comprising a thinning organic liquid and a reaction product of boric acid and a member of the group consisting of the glycols and glycerine, said thinning organic liquid being a member of the group consisting of glycerine, the glycols, diethylene glycol monomethyl ether, diethylene glycol monoethyl ether, diethylene glycol monobutyl ether, diethyl ether of diethylene glycol, the ethanolamines and sorbitol.

8. A fluid composition having a specific gravity of about 1.315 at 80° F. and a viscosity of about 50 minutes at 88° F., as determined by the Saybolt Standard Universal viscosimeter and comprising an anti-freezing salt, glycerine and a reaction product of boric acid and a member of the group consisting of the glycols and glycerine.

9. A fluid for transmitting power from the driving rotor to the driven rotor in turbine drives and fluid fly-wheels of an automobile engine and carry the driven along with the driving rotor at substantially the same speed as the driving rotor when the automobile is travelling under ordinary load and to suffer no loss in weight for a total running time of at least 500 hours by frictional heating of said fluid when slip takes place between rotors under other conditions of operation, said fluid being non-drying, forming no gummy films, no gummy sediment and no crusty deposits on standing, having lubricating qualities, a specific gravity of 1.2 to 1.325 at 80° F. and a viscosity of 40 to 100 minutes at 88° F., as determined by the Saybolt Standard Universal viscosimeter, and comprising a thinning organic liquid of boiling point within the limits of 172–290° C. and a reaction product of boric acid and a member of the group consisting of the glycols and glycerine.

10. A fluid for transmitting power from the driving rotor to the driven rotor in turbine drives and fluid fly-wheels of an automobile engine and carry the driven along with the driving rotor at substantially the same speed as the driving rotor when the automobile is travelling under ordinary load and to suffer no loss in weight for a total running time of at least 500 hours by frictional heating of said fluid when slip takes place between rotors under other conditions of operation, said fluid being non-drying, forming no gummy films, no gummy sediment and no crusty deposits on standing, having lubricating qualities, a specific gravity of about 1.315 at 80° F. and a viscosity of about 50 minutes at 88° F., as determined by the Saybolt Standard Universal viscosimeter, and comprising a thinning organic liquid of boiling point within the limits of 172–290° C. and a reaction product of boric acid and a member of the group consisting of the glycols and glycerine.

11. A power transmitting system for turbine drives and fluid fly-wheels of an automobile engine, said system having a hydraulic power transmission comprising driving and driven rotors in parallel relation and cooperating radial vanes in opposing sides thereof and a fluid for transmitting power from the driving rotor to the driven rotor and carry the driven along with the driving rotor at substantially the same speed as the driving rotor when the automobile is travelling under ordinary load and to suffer no loss in weight for a total running time of at least 500 hours by frictional heating of said fluid when slip takes place between rotors under other conditions of operation, said fluid being non-corrosive, non-drying, forming no gummy films, no gummy sediment and no crusty deposits on standing, having lubricating qualities, a specific gravity of 1.1 to 1.35 at 80° F. and a viscosity of 30 to 150 minutes at 88° F., as determined by the Saybolt Standard Universal viscosimeter, and comprising a thinning organic liquid of boiling point within the limits of 172–290° C. and a reaction product of boric acid and a member of the group consisting of the glycols and glycerine.

12. A power transmitting system for turbine drives and fluid fly-wheels of an automobile engine, said system having a hydraulic power transmission comprising driving and driven rotors in parallel relation and cooperating radial vanes in opposing sides thereof and a fluid for transmitting power from the driving rotor to the driven rotor and carry the driven along with the driving rotor at substantially the same speed as the driving rotor when the automobile is travelling under ordinary load and to suffer no loss in weight for a total running time of at least 500 hours by frictional heating of said fluid when slip takes place between rotors under other conditions of operation, said fluid being non-corrosive, non-drying, forming no gummy films, no gummy sediment and no crusty deposits on standing, having lubricating qualities, a specific gravity of 1.2 to 1.325 at 80° F. and a viscosity of 40 to 100 minutes at 88° F., as determined by the Saybolt Standard Universal viscosimeter, and comprising a thinning organic liquid of boiling point within the limits of 172–290° C. and a reaction product of boric acid and a member of the group consisting of the glycols and glycerine.

13. A power transmitting system for turbine drives and fluid fly-wheels of an automobile engine, said system having a hydraulic power transmission comprising driving and driven rotors in parallel relation and cooperating radial vanes in opposing sides thereof and a fluid for transmitting power from the driving rotor to the driven rotor and carry the driven along with the driving rotor at substantially the same speed as the driving rotor when the automobile is travelling under ordinary load and to suffer no loss in weight for a total running time of at least 500 hours by frictional heating of said fluid when slip takes place between rotors under other conditions of operation, said fluid being non-corrosive, non-drying, forming no gummy films, no gummy sediment and no crusty deposits on standing, having lubricating qualities, a specific gravity of about 1.315 at 80° F. and a viscosity of about 50 minutes at 88° F., as determined by the Saybolt Standard Universal viscosimeter, and comprising a thinning organic liquid of boiling point within the limits of 172–290° C. and a reaction product of boric acid and a member of the group consisting of the glycols and glycerine.

ISAAC C. POPPER.